June 18, 1946.  C. H. PHELPS  2,402,205
V-BEARING
Filed May 25, 1945
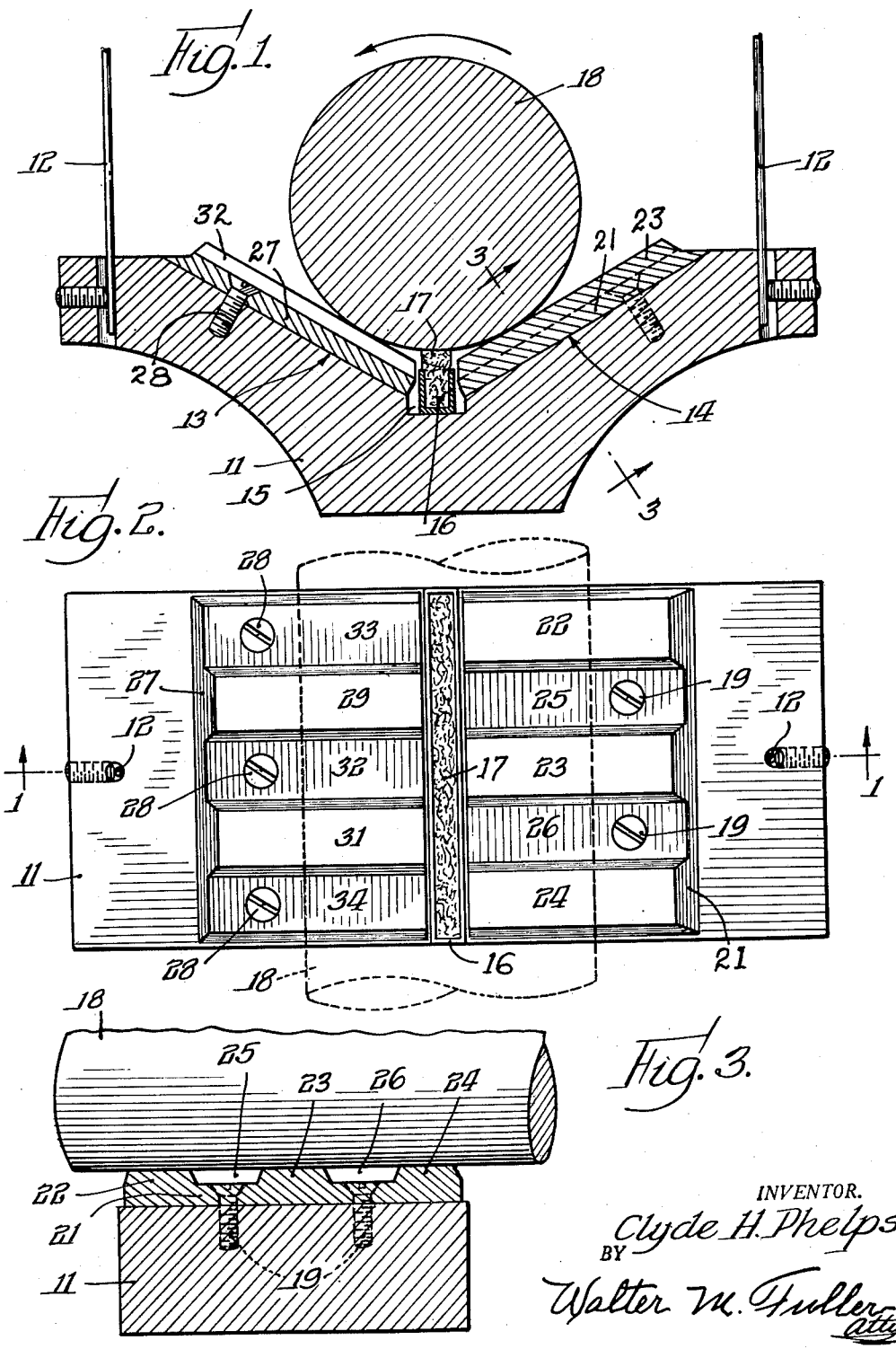
INVENTOR.
Clyde H. Phelps
BY Walter M. Fuller
Atty.

Patented June 18, 1946

2,402,205

UNITED STATES PATENT OFFICE 2,402,205

V-BEARING

Clyde H. Phelps, Springfield, Ill., assignor to Weaver Manufacturing Company, Springfield, Ill., a corporation of Illinois Application May 25, 1945, Serial No. 595,848

4 Claims. (Cl. 308—132)

The current invention concerns certain novel betterments and accruing advantages in shaft-bearings and more particularly, but not necessarily exclusively, in universal-fit bearings adapted for satisfactory and efficient employment in dynamic balancing-machines.

In order accurately to indicate the degree or extent of unbalance in a revolving rotor, the latter must be supported for rotation in bearings that fit the shaft of the rotor without looseness.

The procurement of such a near perfect bearing fit is a difficult, slow and expensive procedure and particularly so when considered for a large number of duplicate rotors in production balancing when shaft diameters vary.

The current invention involves the substantial and important feature of a universal fit due to the V-shape of the bearing, the latter accommodating a wide range of shaft sizes with a near perfect fit.

A further aim or object of the invention is to provide efficient lubrication for both sides of the V-bearing surface.

The innovatory bearing surfaces incorporating the present invention consist of upstanding ribs, staggered with respect to each other on the two sides of the V, so that oil or other lubricant picked up by the shaft from a wick is carried around by the shaft to lubricate the rib surfaces, the instant construction providing means to lubricate both sides of the V by a single, properly-positioned wick.

Moreover, in the improved bearing embodying this invention, it is only necessary to raise or lower the bearing to accommodate rotors that have different diameter shafts at opposite ends.

The ribbed surfaces of the bearing, ordinarily of a bearing-material, such as Babbitt-metal, quickly forms a near perfect bearing seat upon shaft rotation, so that rotor after rotor, regardless of varying shaft diameters, may be revolved and their unbalance corrected in the same pair of bearings always with a near perfect bearing fit.

The ribbed surfaces differ from the ordinary flat V-block bearing because the space between the lower ends of the two sets of ribs provide room for the oil film on the shaft, picked up from the wick, to lubricate the opposed ribs continuously.

In order that those trained and skilled in this art may have a complete understanding of the present invention and the benefits resulting from its employment, in the accompanying drawing, forming a part of this specification, a current preferred embodiment of the invention has been illustrated in detail and to such drawing reference should be had in connection with the following description of the appliance illustrated therein.

For simplicity, like reference numerals have been employed to denote the same parts of the structure throughout the views thereof.

In this drawing:

Figure 1 is a cross-section through the novel and improved bearing on line 1—1 of Figure 2, the shaft of the rotor being shown in section;

Figure 2 is a plan view of the bearing with the shaft not present depicted in dotted lines; and Figure 3 is a longitudinal section through the bearing on line 3—3 of Figure 1.

In this particular incorporation of the invention in physical form, the bearing-support 11 is hung at its opposite ends in any approved manner on wires 12, 12 depending from standards above, but not shown, thus giving the bearing capacity for free movement of oscillation or vibration due to unbalance in a substantially-horizontal plane.

Member 11 has two, companion, upwardly-diverging, smooth surfaces 13 and 14 with a channel or groove 15 extending lengthwise the bearing between the lower ends of such surfaces, such space 15 accommodating an elongated open-top oil reservoir 16 from which a felt wick 17 protrudes into engagement with the undersurface of the shaft 18 occupying the bearing, such receptacle and its wick being of a length at least equalling the longitudinal extent of the bearing.

Fastened by screws 19, 19 to the surface 14 is a multi-ribbed bearing surface-member, designated as a whole 21, comprising three, parallel, upwardly-sloping ribs 22, 23, and 24 extended directly transversely of the length of the bearing and separated from one another by rectangular troughs or spaces 25 and 26, the two screws 19, 19 extending through holes of the member 21 at the bottoms of the two channels 25 and 26.

The companion bearing surface-member 27, mounted by three screws 28 in like manner on the other sloping cooperative surface 13, has two ribs 29 and 31 lengthwise in register with the channels 25 and 26 of the other member 21 and it has a channel 32, between the two ribs 29 and 31, in register with the rib 23 of the other block 21.

The end portions 33 and 34 of this surface-member 27, outwardly beyond the two ribs 29 and 31, are of reduced thickness corresponding to that of the bottoms of the channels 29 and 31, affording convenient means for attachment of the part 27 in place by two of the screws 28, all as is clearly illustrated.

When shaft 18 of the rotor occupies this ribbed V-bearing in contact with the ribs 22, 23 and 24 and also with ribs 29 and 31, as shown in Figure 1, and is rotated in the direction indicated by the arrow it has lubricant supplied to it at its lowest point by the wick 17, and, as the shaft revolves, it conveys lubricant to the surfaces of the three ribs 22, 23 and 24 keeping them adequately supplied therewith and it also transfers lubricant with it over to the other side of the bearing and applies it to the complementary ribs 29 and 31 maintaining them sufficiently supplied therewith, whereby all surfaces with which the shaft is in contact are effectively lubricated at all times.

When the oil in the receptacle 16 needs replenishing, it and its wick can be readily withdrawn from the bearing and supplied with added oil and then replaced with ease and feasibility.

Those acquainted with this art will readily understand that this invention, as defined by the appended claims, is not necessarily confined to the details of the structure and function herein set forth and that reasonable modifications may be availed of without departure from the fundamental principles of the invention and without the loss of any of its substantial benefits and advantages.

For instance, the number of ribs, constituting the bearing surfaces, may be different from those shown, the manner of applying the lubricant to such ribs may be changed, and the mode of suspending the bearing may be different, etc.

I claim:

1. In a V-bearing adapted to support a rotating shaft, the novel improvement that each of the two diverging shaft-supporting parts of the bearing has a plurality of transverse, spaced-apart, upwardly-sloping surface ribs on which a portion of the shaft is adapted to bear and rotate, such ribs of each such part being in register with the spaces between the ribs of the companion part, and means to apply lubricant to the rotating shaft while occupying said bearing for a length of the shaft corresponding to at least the length of the bearing equipped with said ribs.

2. The novel improvement of the V-bearing set forth in claim 1, in which said lubricant applying means is at the bottom of the V.

3. The novel improvement in the V-bearing set forth in claim 1, in which said lubricant-applying means occupies a space longitudinally of the bearing between the lower ends of the two sets of ribs.

4. The novel improvement in the V-bearing set forth in claim 1, including the additional improvement that said lubricant-applying means comprises an oil reservoir equipped with a protruding wick to engage the underportion of the shaft, said oil reservoir occupying a space longitudinally of the bearing between the lower ends of the two sets of ribs.

CLYDE H. PHELPS.